(12) United States Patent
Johansson

(10) Patent No.: US 8,606,460 B2
(45) Date of Patent: Dec. 10, 2013

(54) METHOD, AN ELECTRICAL SYSTEM, A DIGITAL CONTROL MODULE, AND AN ACTUATOR CONTROL MODULE IN A VEHICLE

(75) Inventor: Rikard Johansson, Linköping (SE)

(73) Assignee: SAAB AB, Linköping (SE)

( * ) Notice: Subject to any disclaimer, the term of this patent is extended or adjusted under 35 U.S.C. 154(b) by 1705 days.

(21) Appl. No.: 12/007,234

(22) Filed: Jan. 8, 2008

(65) Prior Publication Data

US 2009/0031198 A1    Jan. 29, 2009

(30) Foreign Application Priority Data

Jan. 8, 2007  (EP) .................................. 07100216

(51) Int. Cl.
*G06F 7/00*    (2006.01)

(52) U.S. Cl.
USPC ........... 701/36; 244/75.1; 244/76 R; 244/194; 714/699; 714/799; 714/E11.024

(58) Field of Classification Search
USPC ............... 701/1, 36; 714/799, E11.024, 699; 710/200, 260; 477/3; 74/325; 244/194, 244/75.1, 76 R
See application file for complete search history.

(56) References Cited

U.S. PATENT DOCUMENTS

| | | | | |
|---|---|---|---|---|
| 4,224,907 A | * | 9/1980 | Lefeuvre et al. | 123/352 |
| 4,356,546 A | * | 10/1982 | Whiteside et al. | 714/10 |
| 4,807,132 A | * | 2/1989 | Arai et al. | 701/104 |
| 5,140,241 A | * | 8/1992 | Kobayashi | 318/626 |
| 5,304,751 A | * | 4/1994 | Skalski et al. | 187/393 |
| 6,233,511 B1 | * | 5/2001 | Berger et al. | 701/50 |
| 6,256,011 B1 | * | 7/2001 | Culver | 345/157 |
| 6,443,399 B1 | * | 9/2002 | Yount et al. | 244/196 |
| 6,938,115 B2 | * | 8/2005 | Johansson | 710/200 |
| 7,017,861 B1 | * | 3/2006 | Johansson et al. | 244/194 |

(Continued)

FOREIGN PATENT DOCUMENTS

| | | | |
|---|---|---|---|
| EP | 1942054 B1 | * | 5/2013 |
| WO | WO-02/06115 A1 | | 1/2002 |

OTHER PUBLICATIONS

Application of vehicle seat vibrator using electric actuator control algorithm; Kyoung Dal Kim; Seung Heui Lee; Dong Woon Park; Min Cheol Lee; Wan Suk Yoo; Control, Automation and Systems, 2007. ICCAS '07. International Conference on; Digital Object Identifier: 10.1109/ICCAS.2007.4407047; Publication Year: 2007, pp. 1021-1024.*

(Continued)

*Primary Examiner* — Cuong H Nguyen

(74) *Attorney, Agent, or Firm* — Venable LLP; Eric J. Franklin

(57) ABSTRACT

A method, control module and system of a vehicle including at least a first and a second control computer each containing a number of local Digital Control Modules and at least one Actuator Control Module wherein the Actuator Control Module of each control computer is operatively connected to all local Digital Control Modules of the same control computer, wherein the Actuator Control Module of each control computer is further operatively connected to all Digital Control Modules of the electrical system in a manner that enables each Actuator Control Module of the system to receive internal data of each Digital Control Module of the electrical system.

10 Claims, 11 Drawing Sheets

(56) References Cited

U.S. PATENT DOCUMENTS

| | | | |
|---|---|---|---|
| 7,636,648 B2* | 12/2009 | Johansson et al. | 702/184 |
| 7,770,842 B2* | 8/2010 | Benson | 244/75.1 |
| 7,809,496 B2* | 10/2010 | Johansson | 701/117 |
| 7,840,832 B2* | 11/2010 | Johansson et al. | 714/2 |
| 8,200,344 B2* | 6/2012 | Li et al. | 700/38 |
| 2001/0028361 A1* | 10/2001 | Culver | 345/701 |
| 2003/0047604 A1* | 3/2003 | McClure et al. | 235/386 |
| 2006/0021456 A1* | 2/2006 | Hughes | 74/340 |
| 2006/0043242 A1* | 3/2006 | Benson | 244/175 |
| 2006/0130601 A1* | 6/2006 | Hughes | 74/340 |
| 2006/0267731 A1* | 11/2006 | Chen | 340/10.1 |
| 2007/0135975 A1* | 6/2007 | Stange et al. | 701/3 |
| 2007/0250183 A1* | 10/2007 | Howell et al. | 700/20 |
| 2007/0260967 A1* | 11/2007 | Johansson et al. | 714/819 |
| 2007/0268819 A1* | 11/2007 | Johansson et al. | 370/216 |
| 2008/0104491 A1* | 5/2008 | Johansson et al. | 714/799 |
| 2009/0031198 A1* | 1/2009 | Johansson | 714/799 |
| 2010/0083056 A1* | 4/2010 | Spier et al. | 714/47 |
| 2010/0315250 A1* | 12/2010 | Fisk et al. | 340/665 |
| 2011/0202203 A1* | 8/2011 | Johansson | 701/2 |

OTHER PUBLICATIONS

On the design of linear virtual sensors for low cost vehicle stability control; Canale, M.; Fagiano, L.; Ruiz, F.; Signorile, M.C.; Control Applications, 2008. CCA 2008. IEEE International Conference on; Digital Object Identifier: 10.1109/CCCA.2008.4629649 Publication Year: 2008, pp. 1-6.*
A study on the use of virtual sensors in vehicle control; Canale, M.; Fagiano, L.; Ruiz, F.; Signorile, M.C.; Decision and Control, 2008. CDC 2008. 47th IEEE Conference on; Digital Object Identifier: 10.1109/CDC.2008.4739323 ; Publication Year: 2008, pp. 4402-4407.*
Virtual reality for operating control of underwater vehicle; Renzhong Zhang; Gong Wei; Chugang Zhang; Intelligent Processing Systems, 1997. ICIPS '97. 1997 IEEE International Conference on; vol. 2; Digital Object Identifier: 10.1109/ICIPS.1997.669356; Publication Year: 1997, pp. 1756-1759 vol. 2.*
Nonholonomic equivalent disturbance based backward motion control of tractor-trailer with virtual steering; Matsushita, K.; Murakami, T.; Industrial Electronics Society, 2005. IECON 2005. 31st Annual Conference of IEEE; Digital Object Identifier: 10.1109/IECON. 2005.1569223; Publication Year: 2005.*
Virtual partitioning resource allocation for multiclass traffic in cellular systems with QoS constraints; Jianxin Yao; Mark, J.W.; Tung Chong Wong; Yong Huat Chew; Kin Mun Lye; Kee-Chaing Chua; Vehicular Technology, IEEE Transactions on vol. 53, Issue: 3; Digital Object Identifier: 10.1109/TVT.2004.825746; Publication Year: 2004, Page(s):.*
Powerline communication in electric vehicles; Bassi, E.; Benzi, F.; Almeida, L.; Nolte, T.; Electric Machines and Drives Conference, 2009. IEMDC '09. IEEE International; Digital Object Identifier: 10.1109/IEMDC.2009.5075439; Publication Year: 2009, pp. 1749-1753.*
A backup system for automotive steer-by-wire, actuated by selective braking; Dominguez-Garcia, A.D.; Kassakian, J.G.; Schindall, J.E.; Power Electronics Specialists Conference, 2004. PESC 04. 2004 IEEE 35th Annual; vol. 1; Digital Object Identifier: 10.1109/PESC. 2004.1355774; Publication Year: 2004, pp. 383-388 vol. 1.*
Algorithms for management of a multi-platooning system of IVC-enabled autonomous vehicles, with high traffic capacity; Fernandes, Pedro; Nunes, Urbano; Intelligent Transportation Systems (ITSC), 2011 14th International IEEE Conference on Digital Object Identifier: 10.1109/ITSC.2011.6082989; Publication Year: 2011, pp. 1935-1941.*
The system development of unmanned vehicle for the teleoperated system interfaced with driving simulator; Duk-Sun Yun; Jae-Heung Shim; Min-Seok Kim; Young-Hoon Park; Jung-Ha Kim Robotics and Automation, 2001. Proceedings 2001 ICRA. IEEE Inter. Conf. on;vol. 1; Digital Object Id.: 10.1109/ROBOT.2001.932630; Pub. Year: 2001, pp. 686-691, vol. 1.*
Effects of control structure on performance for an automotive powertrain with a continuously variable transmission; Liu, S.; Stefanopoulou, A.G.; Control Systems Technology, IEEE Transactions on; vol. 10, Issue: 5; Digital Object Identifier: 10.1109/TCST. 2002.801881; Publication Year: 2002, pp. 701-708.*
An electrostatically actuated valve for turbulent boundary layer control; Frutos, J.R. ; Vernier, D. ; Bastien, F. ; de Labachelerie, M. ; Bailly, Y.; Sensors, 2005 IEEE; Digital Object Identifier: 10.1109/ ICSENS.2005.1597642 Publication Year: 2005.*
Simple fly-by-wire actuator; Jenney, G.D.; Aerospace and Electronics Conference, 1991. NAECON 1991., Proceedings of the IEEE 1991 National Digital Object Identifier: 10.1109/NAECON.1991. 165796; Publication Year: 1991, pp. 522-528 vol. 2.*
System integration issues in Apollo 11; Blair-Smith, H. ;Digital Avionics Systems Conference (DASC), 2010 IEEE/AIAA 29th Digital Object Identifier: 10.1109/DASC.2010.5655328; Publication Year: 2010, pp. 4.E.1-1-4.E.1-11.*
Hardware in the loop laboratory simulation to test a distributed avionic system; Seminario, M.A. ; Insaurralde, C.C. ; Jimenez, J.F. ; Giron-Sierra, J.M.; Digital Avionics Systems Conference, 2005. DASC 2005. The 24th; vol. 2; Digital Object Identifier: 10.1109/ DASC.2005.1563460; Publication Year: 2005.*
European Search Report—Jul. 4, 2007.

\* cited by examiner

Figures 6A, 6B, 6C, 6D, 6E:
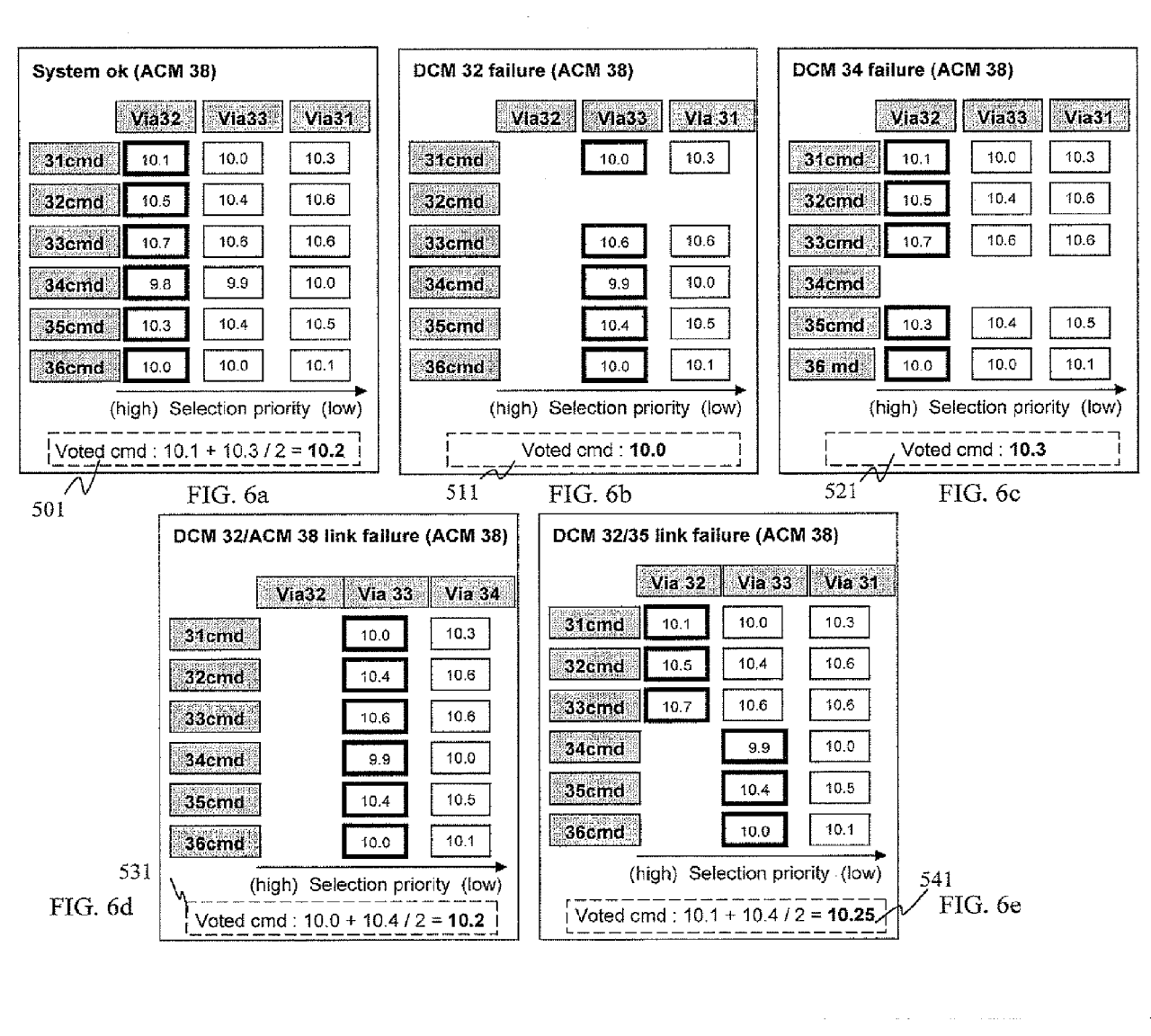

FIG. 6a — System ok (ACM 38), Voted cmd: 10.1 + 10.3 / 2 = 10.2

FIG. 6b — DCM 32 failure (ACM 38), Voted cmd: 10.0

FIG. 6c — DCM 34 failure (ACM 38), Voted cmd: 10.3

FIG. 6d — DCM 32/ACM 38 link failure (ACM 38), Voted cmd: 10.0 + 10.4 / 2 = 10.2

FIG. 6e — DCM 32/35 link failure (ACM 38), Voted cmd: 10.1 + 10.4 / 2 = 10.25

METHOD, AN ELECTRICAL SYSTEM, A DIGITAL CONTROL MODULE, AND AN ACTUATOR CONTROL MODULE IN A VEHICLE

FIELD OF THE INVENTION

The present invention relates to a system, control module, and method for a vehicle. Specifically, the invention relates to enhance the reliability in a control system of a vehicle.

BACKGROUND OF THE INVENTION

In the field of avionics, it has always been of high priority and great interest to focus on the reliability of electrical systems. It is, of course, of great importance that each system is reliable in an aerial vehicle in order to have the flight function properly. Generally, the reliability has been solved by providing backup systems to main systems, wherein the backup system takes over the control when a main system is rendered inoperative. However, introducing backup system to the main systems generates high costs, increasing weight as well as volume and reduces the Mean-time-between-failures, MTBF, for the complete system. The reliability is, hence, a parameter that is under continuous development in order to solve the problem and keep the costs at a minimum. One should understand that the cost of duplication of hardware and the like is very high and it is desired during new constructions as well as development of existing systems to avoid an increase of the costs. In civil aircraft design there is a desire to hold down the costs as well as the weight while enhancing safety and reliability.

Often, aircrafts of today use a flight control system architecture that simplified can be described in accordance with prior art shown in FIG. 1. FIG. 1 shows a flight control system 1 according to prior art. A number of sensors 5,6,7,8,9,10 are provided in the aircraft for measuring, indicating or the like, data of the vehicle. These sensor data are fed to three different channels 2,3,4 either directly or over a cross channel data link CCDL 11. Each channel controls a unique set of servomechanisms of the aircraft. In general, each channel contains two digital control modules DCM 12,13,14,15,16,17 that form a COM/MON pair, that is, a DCM monitors itself and when an error is detected the DCM becomes silent and the other DCM is selected as the operative DCM. A DCM comprises processors that calculate, for example, control commands for the actuators, such as servos and the like. In the illustrated example, DCM 12 and DCM 13 of the first channel 2, each send a control command to an Actuator Control Module ACM 18. The ACM 18 receives a control command from the first DCM 12 as well as from the second DCM 13. ACM 18 is configured to use the command from the first DCM and if the first DCM 12 becomes silent the ACM 18 switches to use the other control command coming from the second DCM 13. The ACM 18 uses the control command to control the illustrated actuators 21,22 to desired position. The ACM 18 monitors certain parameters related to the actuator 21,22, for example, actuator position. This data is sent to the DCM 12,13. Then, the DCMs 12,13 use the actuator data for monitoring purposes.

Either the DCM 12 or the DCM 13 controls the actuator 21, depending on which DCM the ACM is using, and the active DCM, that is, the DCM that generates the value the ACM is using, also controls an actuator mode valve of the actuator. The actuator mode-valve is used to select an actuator mode of the actuator arrangement. The actuator can be set in two different modes, a first mode called Normal mode, and a second mode called Damped mode. In the Normal mode the actuator 21 follows the control command coming from the second channel 2, that is, the second channel 2 controls the actuator 21. In the Damped mode, the actuator 21 is permitted to follow the airstream along the wing and does not affect the aerial vehicle, that is, the actuator 21 is set to be passive. The mode valve is switched from the Normal mode to the Damped mode when an error occurs in the actuator or ACM arrangement, for example a malfunction, an actuator hardover or the like.

The described prior art implies that when an error occurs in the DCM 12 of the first channel one can not initiate a flight since a failure of the second DCM 13 would mean that the performance of the aerial flight vehicle would deteriorate, wherein an operator or control system of the aerial vehicle would not be able to control the actuators 21 and 22 of the first channel. Furthermore, which is much more serious, the safety requirements cannot be upheld when only one DCM of the channel is working.

It is therefore an object of the present invention to provide a system that is more reliable and robust to occurring errors in control modules of a flight control system.

SUMMARY OF THE INVENTION

The invention discloses an electrical system of a vehicle comprising at least a first control computer, a first actuator, a first and a second Digital Control Module, and at least one Actuator Control Module arranged to control the first actuator, wherein the Actuator Control Module is connected with a physical connection to the first Digital Control Module and is further connected by a virtual connection to the second Digital Control Module of the electrical system, wherein the Actuator Control Module is arranged to receive internal data of the second Digital Control Module over the physical connection to the first Digital Control Module.

In addition, the electric system may comprise a second control computer, wherein each control computer contains a number of local Digital Control Modules and at least one Actuator Control Module, wherein the first Digital Control Module is arranged at the first control computer and the second Digital Control Module is arranged at the second control computer.

The electrical system may be embodied in a way that disclose that the first control computer comprises the first digital control module, the first actuator control module configured to control the first actuator, the second digital control module, and a second actuator module arranged to control a second actuator, wherein the first and the second digital control module is arranged to generate data for the first actuator, characterised in that the first control module is arranged to receive data relating to the first actuator from the second control module, and the second control module is arranged to receive data relating to the first actuator from the first control module, wherein the first control module and the second control module are arranged to transfer the control commands toward the first actuator module.

In addition, the system may further comprise a digital data carrier arranged to connect the first control computer and the second control computer, wherein the second computer comprises a third control module, a third actuator module configured to control a third actuator, a fourth control module, and a fourth actuator module configured to control a fourth actuator, wherein the third control module is configured to generate and transfer control command for the first actuator to the fourth control module and the fourth control module is configured to generate and transfer control command for the first actuator to the third control module, furthermore, is the third control module arranged to receive control command relating to the first actuator from the fourth control module, and the fourth control module is arranged to receive control command relating to the first actuator from the third control module, wherein the third control module and the fourth control module are arranged to transfer the control commands toward the first actuator module via the first and second control modules.

The third control module may be arranged to transmit the control commands over a point to point connection on the digital data carrier to one of the digital control modules of the first control computer and the fourth control module may be arranged to transmit the control commands over a point to point connection on the digital data carrier to a different digital control modules of the first control computer.

Furthermore, the system may further be embodied wherein the first control module is arranged to receive the control commands relating to the first actuator from the third control module, and the second control module is arranged to receive the control commands relating to the first actuator from the fourth control module, wherein the first control module and the second control module are arranged to transfer the control commands to the first actuator module.

Furthermore, the system may further be embodied where the first control computer contains a first voting mechanism that allows any number of control modules residing in the first computer to produce an output to be used in voting process to determine the mode of an actuator connected to the first control computer and where the second control computer is arranged to perform a second voting process, with inputs from any number of control modules residing in the second control computer, and where the result of this second voting is configured to be used as an input to the first voting mechanism in order to determine a mode of said actuator.

The invention also discloses a digital control module of a first control computer of a control system in a vehicle arranged to calculate a first control command for an actuator of the vehicle, wherein the digital control module is arranged to receive a second control command for the actuator from a second digital control module of the first control computer and to transfer the first control command and the second control command toward an actuator control module in the system.

By using a digital control module to forward data the digital control module virtually connects the actuator control module to another digital control module.

In addition, the digital control module may further be embodied wherein the digital control module is arranged to transfer the control commands over a point to point connection to a third digital control module of a second control computer.

Furthermore, the digital control module may further be embodied wherein the digital control module is arranged to receive a control command over a point to point connection from a fourth digital control module of a third control computer.

Furthermore, the digital control module may further be embodied wherein the digital control module is able to check the validity of the control command.

Furthermore, the digital control module may further be embodied wherein the digital control module is arranged to receive actuator data from an actuator control module from a first control computer and/or a second control computer.

Furthermore, the digital control module may further be embodied wherein the actuator data is used in the calculation of the first control command.

Furthermore, the s digital control module may further be embodied wherein the actuator data is used in determining an output indicating a set condition of an actuator mode valve.

The invention further discloses an actuator control module of a first control computer of a control system in a vehicle arranged to perform a selection process to determine a control command based on control commands received from at least one digital control module according to what is stated above.

That is, the ACM is arranged to receive control commands from a DCM that calculates a control command and forwards a control command. The ACM is thereby virtually connected to a different DCM.

The invention further discloses a method for obtaining data in a control system of a vehicle wherein the data relates to a first actuator in the vehicle, the control system comprising at least a first control computer, a first and a second digital control modules, and a first actuator control module controlling the first actuator, wherein the first actuator control module is connected with a physical connection to at least the first digital control module, wherein the first actuator control module is further connected with a virtual connection to the second digital control module of the electrical system wherein the actuator control module of the control computer is able to communicate the data from/to the second digital control module over the physically connection to the first digital control module.

In addition, the method may further by embodied wherein the first control computer comprises at least two digital control modules and an actuator module; a second control computer comprises at least two digital control modules and an actuator module, and the system further comprises a digital carrier connecting the first and the second control computer, wherein the method comprises the steps of when communicating from each digital control module: calculating a control command for the actuator unit of the first control computer in each digital control module of each control computer; transferring internally of the second control computer the calculated control command from each local digital control module to the other local digital control module residing in the second control computer; receiving internally of the second control computer the calculated control command from the other local digital control module residing in the second control computer; sending the control commands over a point to point connection on the digital carrier from each local digital control module of the second control computer to a digital control module residing in the first control computer, forming a communicating pair of digital control modules residing in different control computers; receiving the control commands at a digital control module of the first control computer, and a control command from the other control module residing on the first computer; transferring the control commands to the actuator control module of the first control computer; receiving the control commands at the actuator control module; and determining an actuator control command at the actuator control module based on the received control commands.

In addition, the method may further by embodied wherein the initial step of calculating the control commands further comprises to receive actuator data from the actuator control module relating to the first actuator.

In addition, the method may further by embodied wherein the received actuator data is used in order to calculate the control command and/or determine an output to set a actuator module valve.

In addition, the method may further by embodied wherein the determining step further comprises the step of: voting the actuator control command based on the number of received control commands, if the number is even voting the actuator control command to the average value of the two middle values, and if the number is odd voting the control command to the middle value of the values.

In addition, the method may further by embodied wherein the method further comprises the step of: packing calculated actuator commands and/or feedback data into a data packet, incorporating a mean of detecting corruption of that data packet and/or that the data is no long updated at a predetermined rate.

The system according to the invention can handle and still function satisfactorily if a large number of control modules fails, resulting in that the system is safer and more reliable. In the prior art redundancy is provided by adding extra control modules to each channel, while the present invention increases the number of commands/data that may be processed to an actuator control module (ACM) by having already existing digital control modules calculating/monitoring control commands/data relating to an actuator of a channel, different than the channel an already existing digital control module is arranged in. The actuator module of the invention then performs a selection process based on all received values.

Thereby, the embodied system has the advantage over conventional systems in that it is basing its control command/data on a larger amount of control commands/data, making the command more reliable. The system is also more reliable concerning failing DCMs, which results in that in bigger civilian aircrafts, the aircrafts will be able to take off even when a DCM is not working. The solution is realised in the system with a minimum of additional hardware in a way that keeps down the increase of the weight, volume, and costs and is doing it by using a traditional technique and without lowering the overall system MTBF.

In an embodiment of the invention wherein the system comprises a plurality of Flight Control Computers, FCC, the digital control modules of the different Flight Control Computers, FCCs, communicate over a point to point connection. Thereby, the system is not as vulnerable to link failures as conventional systems, wherein computers are connected over a broadcast bus. The serial communications links are cheaper and more reliable. The system will function properly even if one, two, or all serial communications between the different FCCs fails.

BRIEF SUMMARY OF THE DRAWINGS

The invention, together with further objectives and advantages thereof, may best be understood by reference to the following description taken in conjunction with the accompanying drawings in which:

FIGS. 6a-6e shows how command voting is performed in the ACM in a control system according to an embodiment of the invention;

DETAILED DESCRIPTION OF EMBODIMENTS OF THE PRESENT INVENTION

In an embodiment of the present invention, a flight control system is constructed, wherein a number of actuators are controlled. An actuator can be used at a remote location to proportionally follow control commands from a control computer, for example an actuating organ, actuator for controlling the flight control surfaces, and the like. In the embodiment the system contains two (or more) Flight Control Computers, FCCs, wherein each FCC comprises any number of channels. Each channel contains a DCM but may also contain one ACM. Each DCM can communicate with all other DCMs in the same FCC and with at least one DCM of the other(s) FCC. An ACM comprises, for example, a loop-closure to the each actuator it is controlling, a voter of commands, and feedback of measuring values from the actuator, loop-closure, and voter circuit etc.

Each ACM is connected to each DCM by means of physical and virtual connections. The physical connections are communication links, such as RS485 or the like, arranged between the DCMs and the ACMs in each FCC, cross channel data links CCDL between DCMs in each FCC, and links between DCM pairs of different FCCs. The virtual connections are the cross connections of the components, that is, the exchange of control commands and actuator data between the different channels, connections that make all the data available to all the components of the system. Hence, all DCMs and ACMs have access to all data processed by the DCMs and ACMs of the system.

Figure 1:
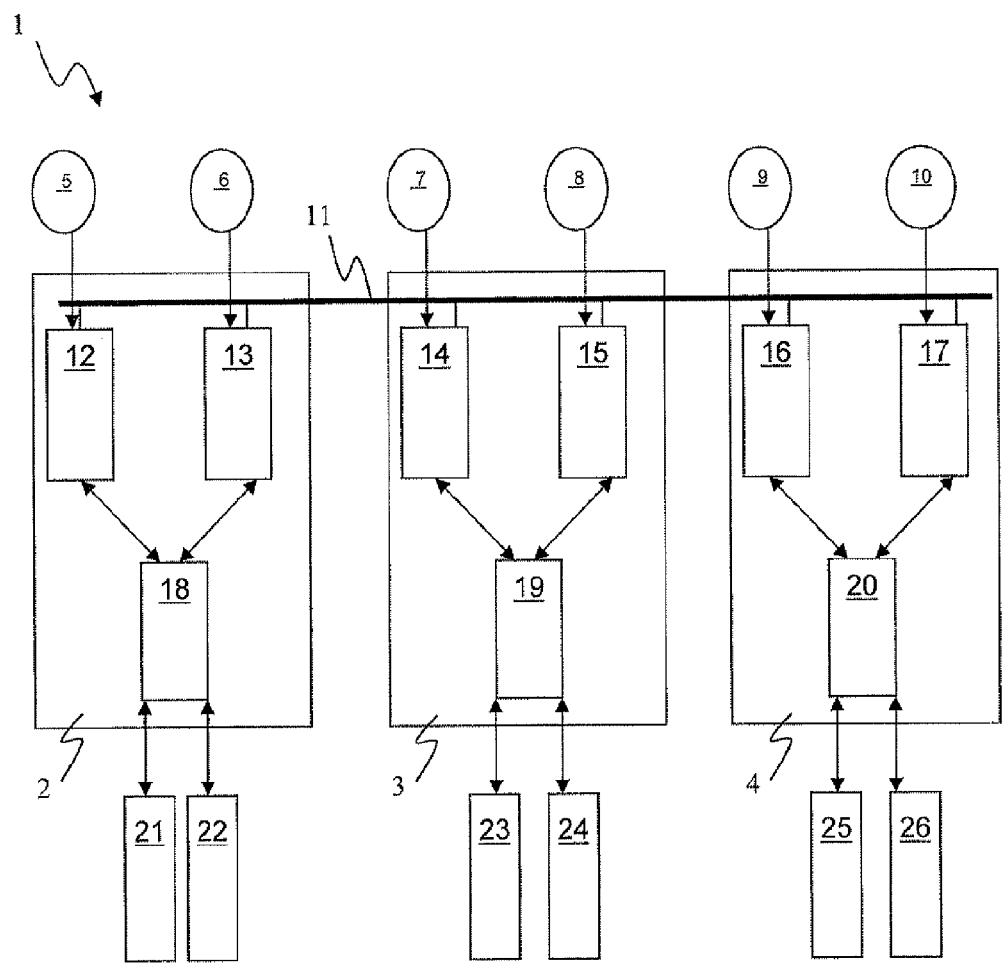
FIG. 1 discloses a system of prior art involving redundancy.
Figure 2:
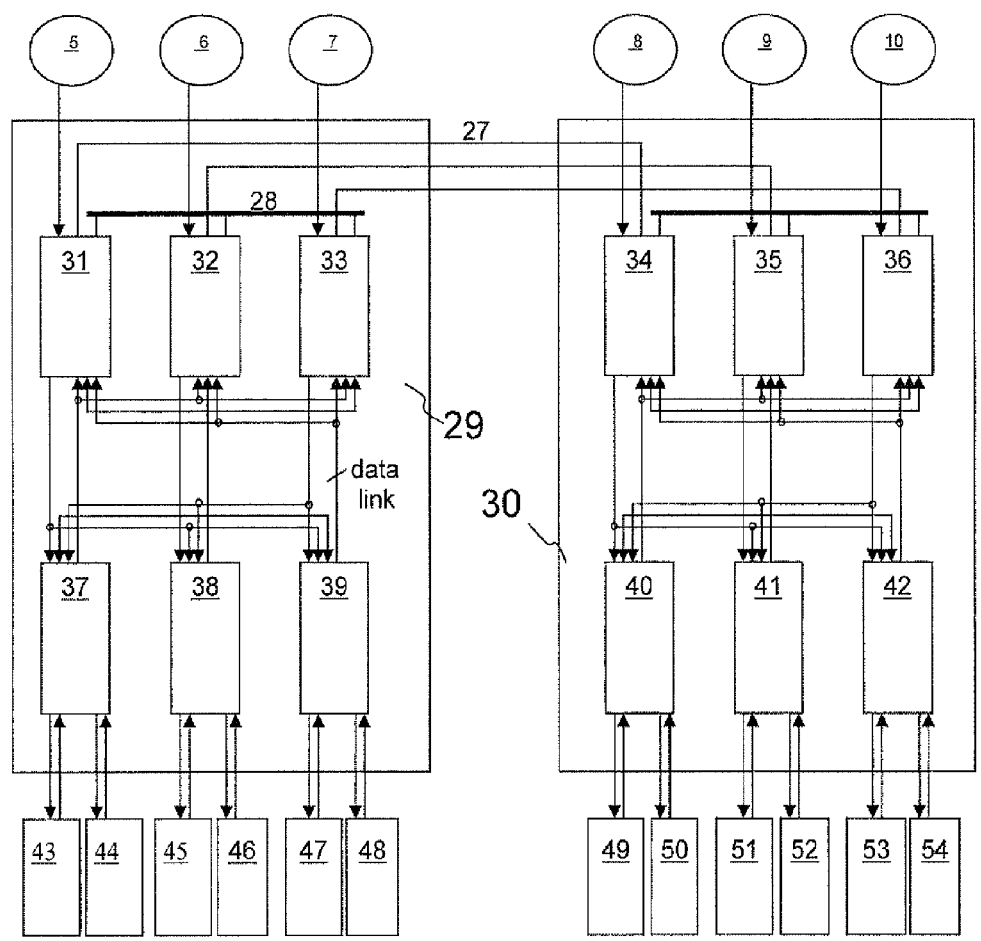
FIG. 2 discloses an illustrated example of a control system in accordance with an embodiment of the present invention.

FIG. 2 discloses an example of a control system in accordance with what is stated above. Sensors 5-10 send data and information to a left FCC 29 and a right FCC 30. The left FCC 29 comprises three channels, wherein each channel includes a DCM 31,32,33 and a ACM 37,38,39. The right FCC 30 also comprises three channels, wherein each channel includes a DCM 34,35,36 and a ACM 40,41,42. In order to distinguish the different DCMs from each other as well as to distinguish the ACMs from each other, the DCMs and ACMs of the different FCCs are defined as follows: DCMs of the left FCC 29 are referred to as, first left DCM 31, second left DCM 32, and third left DCM 33. The DCMs of the right FCC 30 are referred to as; first right DCM 34, second right DCM 35, and third right DCM 36. Similarly, the ACMs of the left FCC 29 are referred to as, first left ACM 37, second left ACM 38, and third left ACM 39. The ACMs of the right FCC 30 are referred to as, first right ACM 40, second right ACM 41, and third right ACM 42.

The first left DCM 31 communicates with all the left ACMs 37,38,39 over data links, such as RS485 or the like, internally of the FCC 29. Furthermore, the first left DCM 31 also communicates with a first right DCM 34 of the right FCC 30. In the illustrated embodiment the first left DCM 31 communicates with the first right DCM 34 over a communications link 27, wherein the communication is dedicated between the first left DCM 31 and the first right DCM 34, that is, the connection is a point to point connection. It should here be noted that the second left DCM 32 and the second right DCM 35 is connected in a similar way just as the third left DCM 33 is connected to the third right DCM 36 in a similar way. The left DCMs 31,32,33 are connected to a cross channel data link CCDL 28 in order to communicate with each other. The left ACMs 37,38,39 then communicate with the different actuators 43-48 over a data link or using analogue communication.

It should be understood that the right DCMs 34,35,36 and the right ACMs 40,41,42 communicate with the actuators 49-54 of the right FCC in a similar way to what is stated above.

Figure 3:
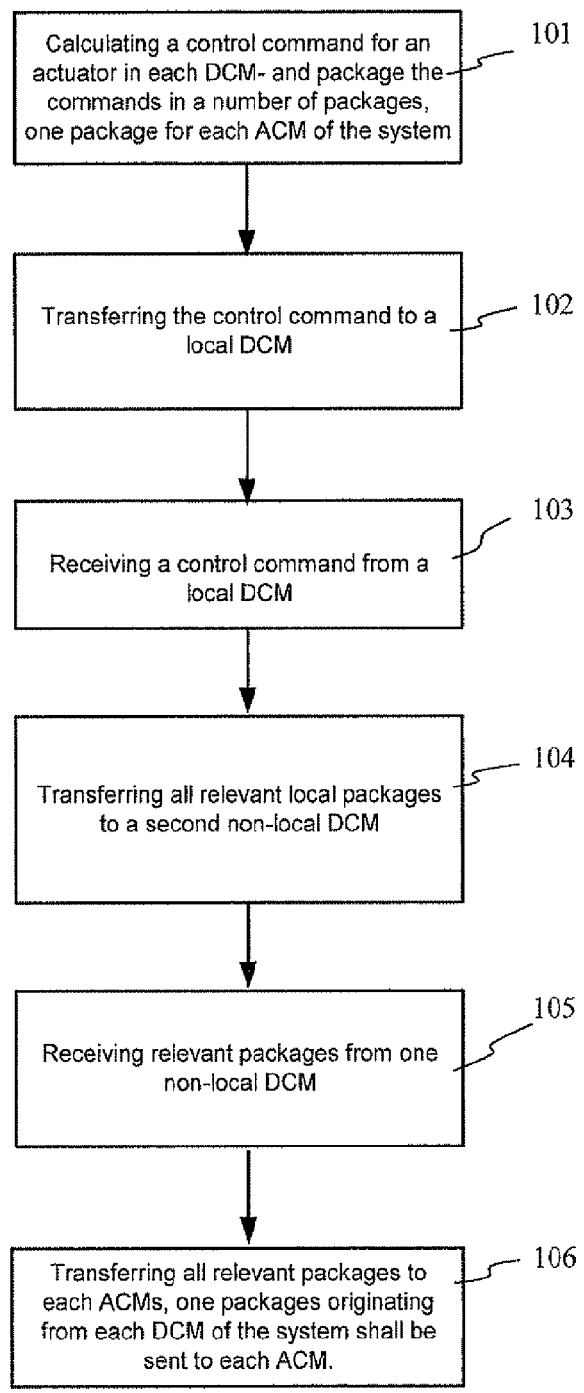
FIG. 3 shows a flow chart of the method of transferring control commands to an ACM.

FIG. 3 discloses a flow chart of a method according to an embodiment of the invention. The method disclosed in FIG. 3 relates to a method for transferring control commands to an ACM of a control system of a vehicle. In step 101, a number of DCMs of the system calculate a control command for an actuator based on sensor data received, actuator data coming, for example, from the actuators, command received from the pilot or the like. If the control system comprises many flight control computers, for example, six, the number of DCMs that calculate control commands may be defined to two FCCs. However, it should be noted that all DCMs of a system may calculate control commands for all actuators of the system, for example in the illustrated example below each DCM calculates two control command values to two actuators of each ACM. The commands are stored in packets according to FIG. 11, one packet for each ACM of the system.

In step 102, all calculated control command packets are transferred from a local DCM to the other local DCMs. By "local" means a DCM residing on the same FCC as the DCM that calculated the control command.

In step 103, each local DCM receives all control command packets from the other local DCMs.

In step 104, the DCM sends all relevant packets to a non-local DCM. Relevant packets are such packets originating from all local channels (received in 103 or calculated in 101) that contain commands to actuators controlled by an ACM that the non-local DCM can communicate with. The packets are sent to this non-local DCM via a communication link.

In step 105, the DCM receives a number of relevant packets from a non-local DCM.

In step 106, the DCM transfers all relevant packets to each ACM it can communicate with, the DCM sends one packet originating from each channel in the system.

Figure 4:
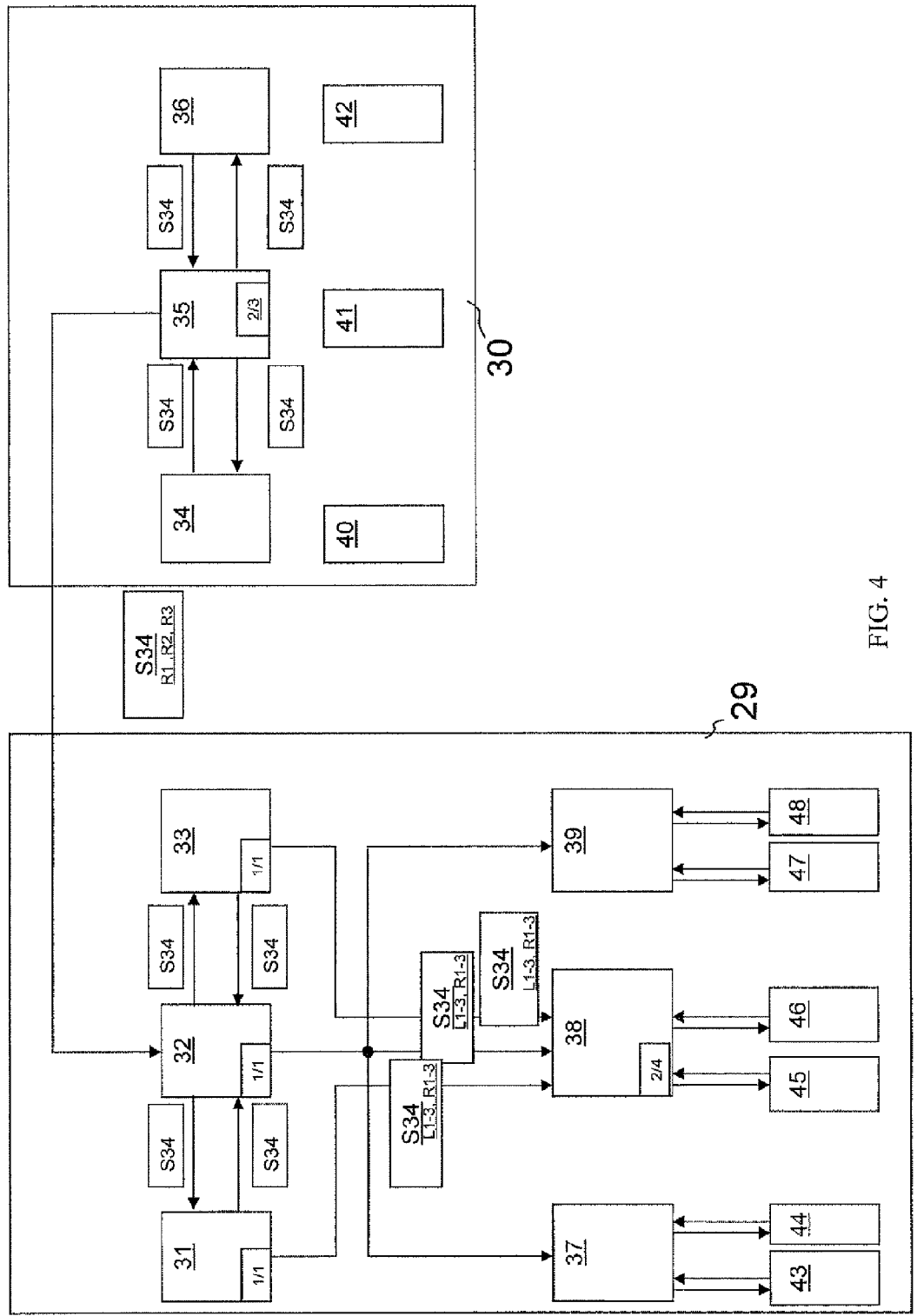
FIG. 4 shows an overview of how control commands are distributed in a control system according to an embodiment of the invention.
Figure 5:
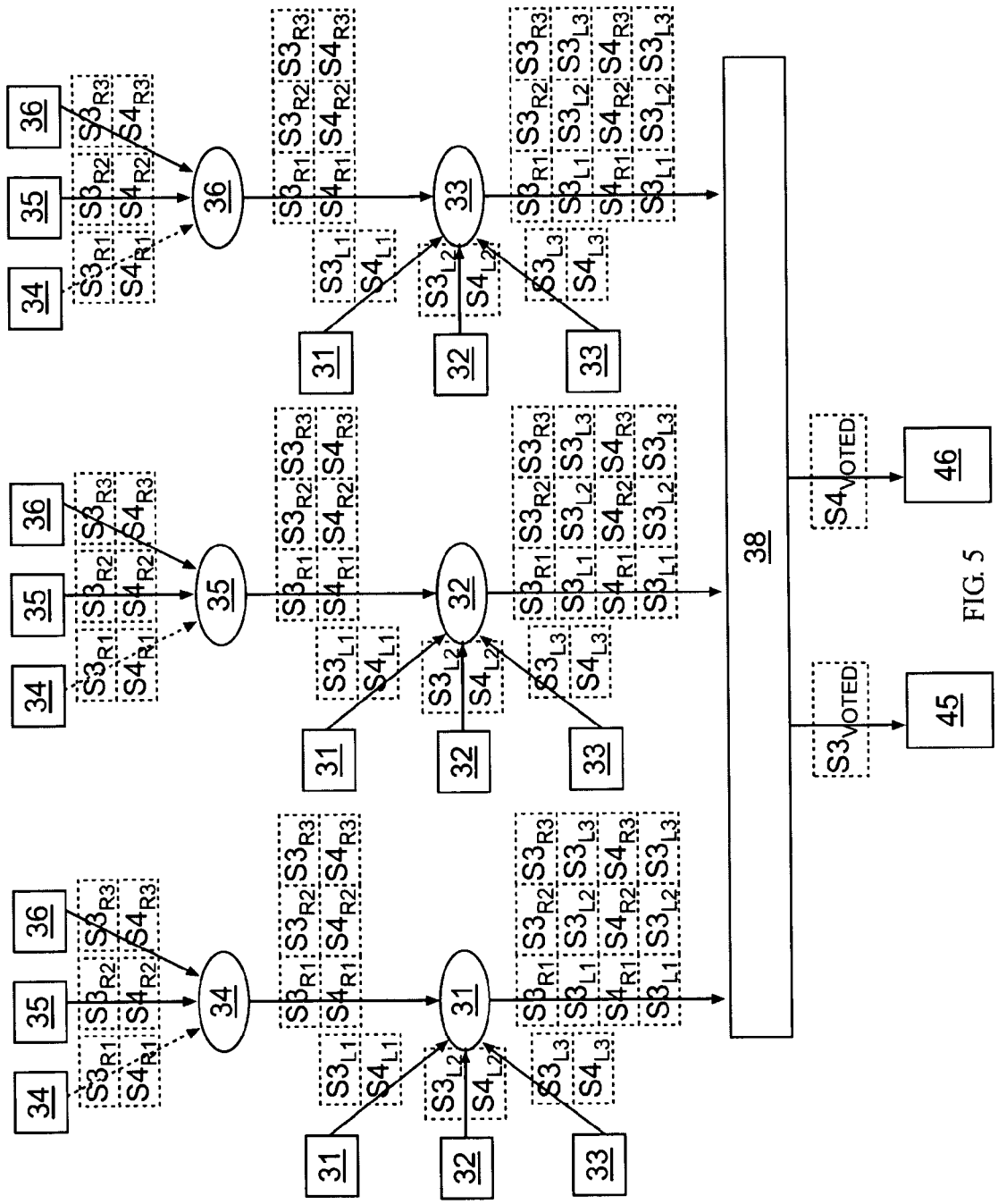
FIG. 5 shows the command data flow in a control system according to an embodiment of the invention as described in FIG. 3.

Each ACM is controlled by a control command based on control commands coming from all DCMs. FIG. 4 shows how the control commands are distributed according to an embodiment of the invention, FIG. 4 only shows how the information flows to ACM 38 in FIG. 4. Control commands S34 for the actuators are calculated in each DCM. It should here be noted that the illustrated packets S34 are not identical but only indicating that the packets contain commands relating to actuator 3 and actuator 4. The difference between the packets in the system is clarified in FIG. 5. In the illustrated example of FIG. 4 control commands for actuator 3, denoted as 45, and actuator 4, denoted as 46, are calculated and distributed to the second left ACM 38 that controls the actuator 45,46. That is, the right DCMs 34,35,36 of the right FCC 30 calculates actuator control commands for the actuators 45,46 and the commands are stored as packets, according to FIG. 11. These control command packets are distributed among the DCMs 34,35,36 of the right FCC 30. In the illustrated example the communication between the second right DCM 35 of the right FCC 30 and the second left DCM 32 is disclosed, however, one should understand that similar communications occur between the first left DCM 31 and the first right DCM 34 as well as between the third left DCM 33 and the third right DCM 36, as shown in FIG. 5. Referring back to FIG. 4, the control commands packets, one packet from each DCM of FCC 30, are transferred from the second right DCM 35 via the point to point connection to the second left DCM 32 of the left FCC 29. The second left DCM 32 receives the control commands from the second right DCM as well as control command packets for the actuators 45, 46 from the first left DCM 31 and the third left DCM of the left FCC 29. These control commands packets received from the first left DCM 31, the third left DCM 33 and the second right DCM 35 are transferred to the second left ACM 38 that controls actuator 45 and 46. In the illustrated example the second left ACM 38 receives packed control commands from the first left DCM 31, the second left DCM 32, and the third left DCM 33. Taken into account the control values from the right FCC, the second left ACM 38 receives eighteen control commands, three from each DCM of the system each routed through a different way. For example, the value calculated at DCM 36 travels three different ways from DCM 36-DCM 33-ACM 38, DCM 36-DCM 35-DCM 32-ACM 38, and DCM 36-DCM 34-DCM 31-ACM 38.

In order to clarify this distribution of control commands, FIG. 5 shows the complete data flow in the system for the second left ACM 38. Each DCM node that is illustrated in a square shaped manner indicates that a command calculation is made in the indicated DCM resulting in control commands packet dedicated to the actuator 45 and 46. Each node that is illustrated in an elliptic shape indicates that the control commands are transferred by the node (without altering the contents of the command packets) to a receiving node. A control command packet is indicated as transparent dotted box. The control command packets are transferred over CCDL to other DCMs, illustrated as a continuous arrow line, or internally calculated (within a single DCM), which is indicated as a dashed arrow line. Now, as illustrated in FIG. 5, each of the right DCMs of the right FCC 30 transfers six control commands for the actuator 45 and 46, three control commands for each servomechanism calculated at each right DCM. The first right DCM 34 sends its six control commands to the first left DCM 31 over a point to point connection. The first left DCM 31 receives six control commands from the first right DCM 34,
two control commands calculated from the second left DCM 32, and
two control commands calculated from the third left DCM 33.

Furthermore, the first left DCM 31 calculates internally control commands for the actuators 45, 46. Hence, the first left DCM 31 sends twelve control commands to the second left ACM 38, six for each actuator controlled by ACM 38.

The second right DCM 35 sends its six control commands to the second left DCM 32 over a point to point connection. The second left DCM 32 receives six control commands from the second right DCM 35,
two calculated control commands from the first left DCM 31, and
two calculated control commands from the third left DCM 33.

Furthermore, the second left DCM 32 calculates internally control commands for the actuators 45, 46. Hence, the second left DCM 32 sends twelve control commands to the second left ACM 38, six for each actuator controlled by ACM 38.

The third right DCM 36 sends its six control commands to the third left DCM 33 over a point to point connection. The third left DCM 33 receives
  six control commands from the third right DCM 36,
  two calculated control commands from the second left DCM 32, and
  two calculated control commands from the first left DCM 31.

Furthermore, the third left DCM 33 calculates internally control commands for the actuators 45, 46. Hence, the third left DCM 33 sends twelve control commands to the second left ACM 38, six for each actuator controlled by ACM 38.

Finally, the second left ACM 38 has received eighteen values for each actuator. That is, the second left ACM receives
  one actuator command for each actuator from each DCM routed via the first left channel of the left FCC and the first right channel of the right FCC
  one actuator command for each actuator from each DCM routed via the second left channel of the left FCC and the second right channel of the right FCC
  one actuator command for each actuator from each DCM routed via the third left channel of the left FCC and the third right channel of the right FCC The received values are then passed through a voting process, whereupon one of the control commands is selected or a value is calculated from the received command values as the actuator command based on set priority and voter requirements.

In an embodiment of the invention the ACMs use a mid level voter MLV. If the number of commands is an even number the averaged value of the two middle values is used, and if the number of values is odd the middle value is used. If only two values are received, the averaged value of these values is used. However, if these two values differ too much, for example, by more than one unit, the servomechanism mode valve is set to Damped mode. Consequently, the ACM is trying to find one valid data packet originating from each channel. The packets are determined to be valid based on checksums and refresh counter update, that is, the checksum of each packet is checked and that the counter of the packet is checked that it is properly updated. In a fault free system three complete packets are received at the ACM, one routed via each local DCM channel. The order of selection of packets is determined in the illustrated example as; a packet from the second left DCM has priority followed by a packet from the third left DCM and last a packet from the first left DCM. In other words, if a local prioritised DCM has sent valid packets these are selected, if not, control commands from one of the other local channels are used. The priority may be preset in the system.

The commands in the valid packets are used in the voting process. As stated in the embodiment above, the following voting algorithm may be used based on number of commands found:
  6 commands—MLV and average value of the two commands
  5 commands—MLV
  4 commands—MLV and average value of the two commands
  3 commands—MLV
  2 commands—Average value
  1 command—use command It should here be note that any voting algorithm, not only the one described above, may be used.

In order to clarify the MLV feature FIGS. 6a-6e are shown. FIGS. 6a-6e show different received control commands at the second left ACM 38 based on if and where a failure has occurred in the system. Furthermore, FIGS. 6a-6e disclose what is stated above concerning the MLV.

FIG. 6a discloses the control commands received at the second left ACM 38 when the system is fault free. The voted command is calculated by taking the average value of the middle values, as seen at 501. That is, 10.1 and 10.3 are the middle values of the values coming via DCM 32, the average value is 10.1+10.3/2=10.2.

FIG. 6b shows the control commands received at the second left ACM 38 in a system, in which the second DCM 32 has failed. As shown in 511 the voted command is the picked middle value, that is, 10.0. The second left ACM 38 has not received control commands from the second left DCM 32 or control commands transferred via the second left DCM 32.

FIG. 6c shows the control commands received at the second left ACM 38 in a system, in which the first right DCM 34 has failed. The ACM 38 has not received control commands from the DCM 34. As disclosed in FIG. 6b, the voted command in FIG. 6c is the middle value of the received control commands from the second left DCM 32, see 521. That is, 10.3.

FIG. 6d discloses the control commands received at the second left ACM 38 when the link between the second left DCM 32 and the second left ACM 38 has failed. The ACM 38 has not received any control commands via the link, that is, transferred from the DCM 32. Since the ACM 38 has received an even number of control command an averaged value of the middle values is calculated as the voted command, see 531. That is, 10.0 and 10.4 are the middle values of the values coming via DCM 33, the average value is 10.0+10.4/2=10.2.

FIG. 6e discloses the control commands received in the system, in which a link between the second left DCM 32 and the second right DCM 35 has failed. The left ACM 38 receives no control commands from the right DCMs via the second left DCM 32. The voted command is calculated based on the average value of the middle values, see 541. That is, 10.1 and 10.4 are the middle values of the values coming via DCM 32 and DCM 33, the average value is 10.1+10.4/2=10.25.

It should be noted in the illustrated FIGS. 6a-6e that the control command values originating from the same DCM differs in value, for example in FIG. 6e the values originating from DCM 32 are 10.5, 10.4 and 10.6 depending on from which DCM the value is coming from. The difference is due to that the system may have a certain asynchronism and that the control command values are delayed differently depending on what route they travel through the system.

Each ACM is connected to each DCM by means of physical and virtual connections. The physical connections are communication links, such as RS485 or the like, arranged between the DCMs and the ACMs in each FCC, cross channel data links CCDL between DCMs in each FCC, and links between DCM pairs of different FCCs. The virtual connections are the cross connections of the components, that is, the exchange of control commands and actuator data between the different channels, connections that make all the data available to all the components of the system. Hence, all DCMs and ACMs have access to all data processed by the DCMs and ACMs of the system.

Figure 7:
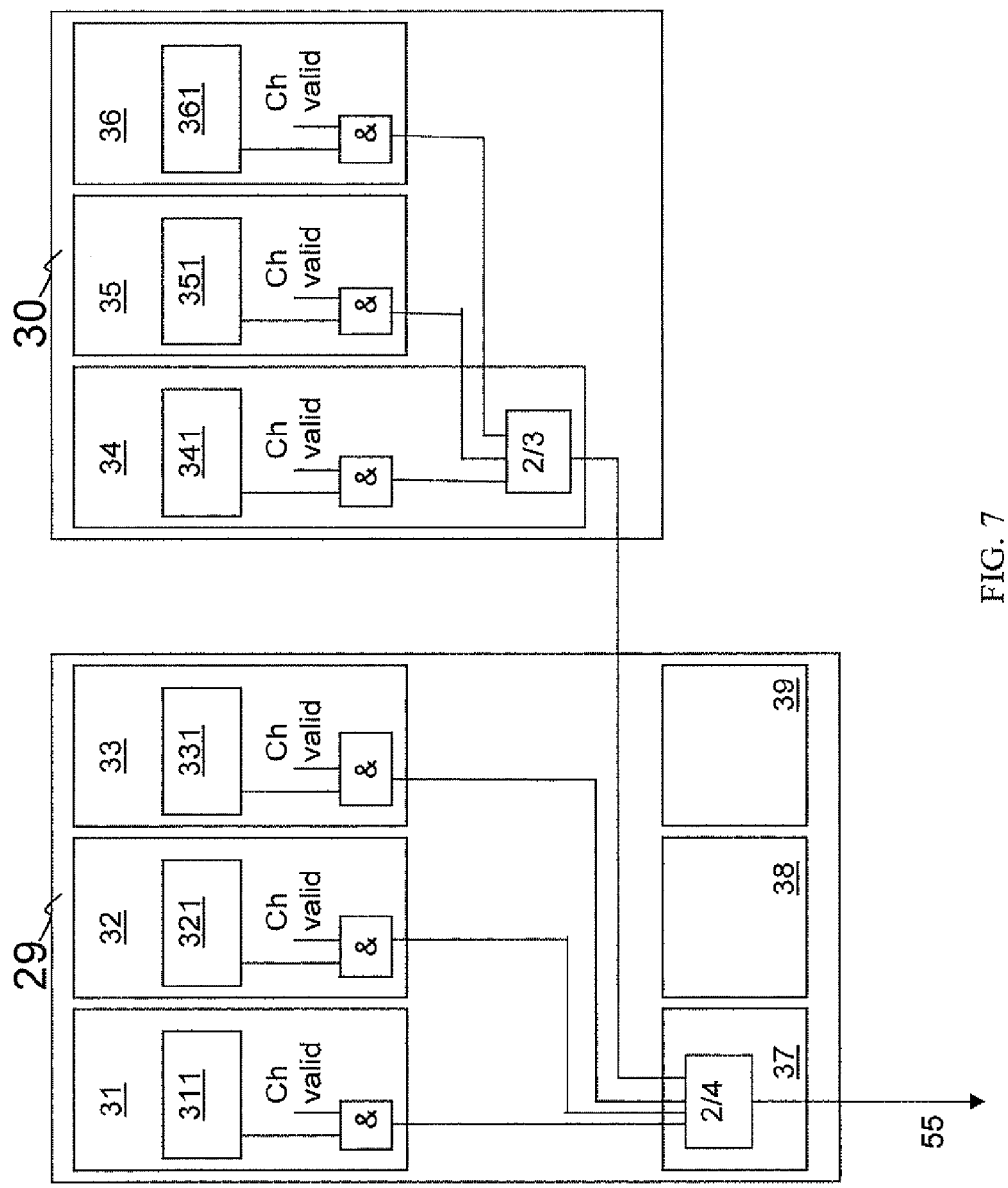
FIG. 7 schematically discloses a process of determining an actuator valve mode.

FIG. 7 shows a schematic overview of the process of setting an actuator mode valve of a control system of a vehicle. As stated above the illustrated embodiment comprises a left FCC 29 and a right FCC 30. The illustrated embodiment discloses the signals travelling from the different DCMs of the system. Each DCM includes software applications that computes the desired mode of each actuator in the system, based on its monitoring of that actuator and a separate (from the software) internal monitoring process that checks if the channel is valid.

The first left DCM 31 comprises software applications denoted as 311. Provided that the channel is valid (as determined by the separate internal monitoring) the software may control the actuator mode. If the channel is not valid the actuator mode command will be set to Damped Mode. As illustrated by FIG. 7, a logic device in one of the channels 34 provides a voting mechanism that determines if the channels of the right FCC 30 shall command the actuator to Normal or Damped Mode. In this embodiment of the invention a 2 of 3 logic is used but it should be understood that any logic may be used to determine the actuator mode command.

Each channel of the left FCC 29 also computes the actuator mode command. The actuator mode command from the right FCC 30 together with the command from the left FCC 29 channels are connected to ACM 37 using communication means that may be independent from the links used for transferring the actuator commands, for example implemented as discrete signals.

ACM 37 will vote the four incoming actuator mode commands and determine the mode for the actuator based on some logic, in this embodiment of the invention a 2 of 4-logic is used but it should be understood that any logic may be used.

Figure 8:
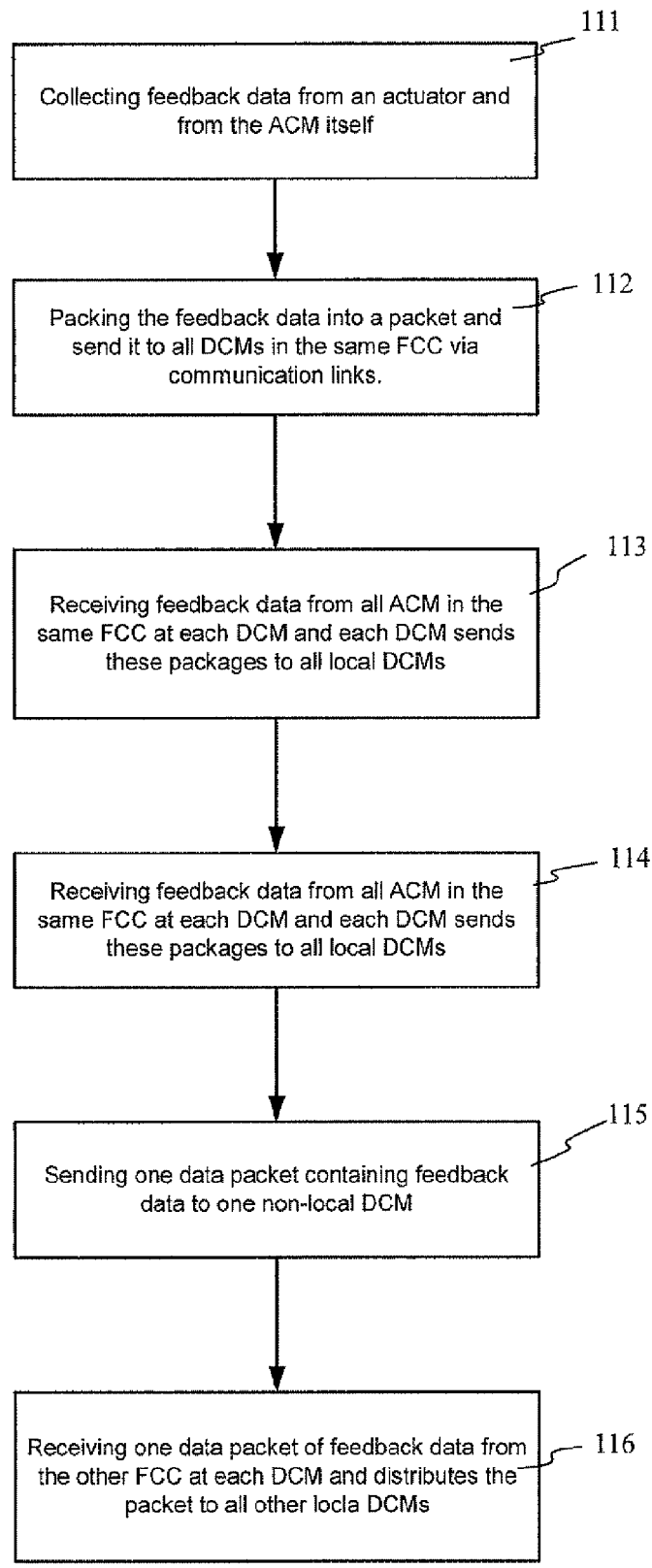
FIG. 8 shows a flow chart of the method of transferring actuator data to DCMs.

FIG. 8 discloses a flow chart of an embodiment of the invention. The method disclosed in FIG. 8 relates to a method for transferring actuator data to each DCM of a control system of a vehicle.

In step 111, an ACM collects feedback data from an actuator, for example actuator position and from itself, for example, selected servo command, selected servo mode command, the amount of current driven through the actuator mode valve and the actuator command valve, continuous Built-In-Test results etc.

Figure 12:
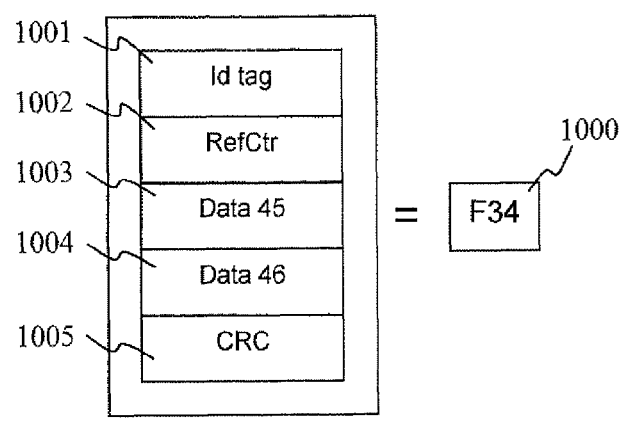
FIG. 12 shows schematically a structure of a packet transferred from an ACM of a system according to an embodiment of the present invention.

In step 112, the ACM packs the feedback data into a packet, see FIG. 12. It should here be understood that if the ACM controls multiple actuators the data from the different actuators are packed into a packet. The packet of feedback data is then transferred to all local DCMs of the FCC, that is, the DCMs residing in the same FCC as the ACM, over a communications link, such as a RS485 link.

In step 113, each local DCM receives the packet containing feedback data from the ACM and in addition the local DCM forwards the packet to the other local DCMs.

In step 114, each local DCM also receives feedback data coming via the other local DCMs. In an embodiment of the invention, the received packet from the ACM and the other local DCMs are unpacked and a voting process is performed on the feedback data in order to select a value of the feedback data. The voted feedback data is then stored and used internally of the DCM in order to, for example set actuator mode valve, calculate control command, and the like.

In step 115, each DCM selects one feedback data packet from each ACM. The packet is transferred over a communications link to a local DCM of the second FCC on a point to point connection, that is, the local DCMs of different FCCs form a DCM communications pair.

In step 116, the DCM of the second FCC receives the packet and distributes the packet to other DCMs of the second FCC. Furthermore, the DCM unpacks the received packets coming from the first FCC over the communication link as well as the packets coming via the local DCMs. These feedback data values are used in, for example, monitoring of the feedback data from ACMs in the other FCC, a voting performance as described above and below etc. The voted feedback data is then stored and used internally of the DCM in order to, for example set actuator mode valve, calculate control command, and the like.

Figure 9:
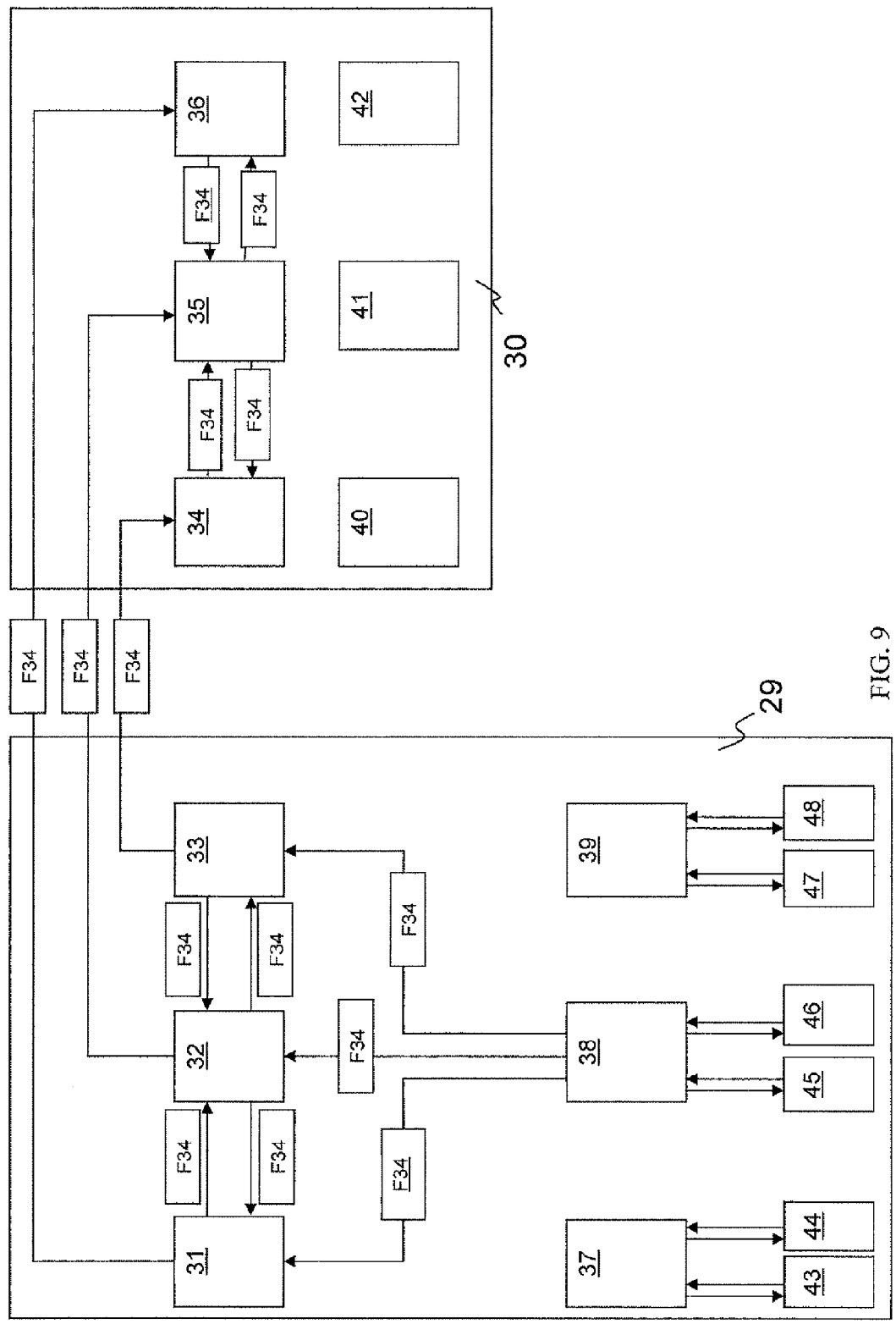
FIG. 9 shows a schematic overview on how servomechanism data is distributed in a system in accordance with an embodiment of the present invention.

FIG. 9 discloses an exemplary process when data is fed from the actuators to the system. In order for every DCM in the system to be able to calculate control commands for each actuator, the DCMs need to have information of present actuator data from the actuators as well as from sensors arranged in the system. The data from the actuators may as well be used in order to determine what state the actuator mode valve should be set.

The feedback data, denoted in the illustrated embodiment as F34, from the actuators 45, 46, for example, position data, operational data or the like, are collected by the second left ACM 38, which forwards the data F34 to all the local DCMs 31,32,33 via communication links. Then, the local DCMs 31,32,33 transfer the data among themselves over a CCDL line. Each local DCM then transmits one set of actuator data F34 received from the ACM 38 or from the other local DMCs over a point to point connection to a DCM of the right FCC 30. In the right FCC 30 the feedback data F34 is distributed among the local DCMs 34-36. By performing this process the reliability of informing the different control components of the system about the feedback data is enhanced.

Figure 10:
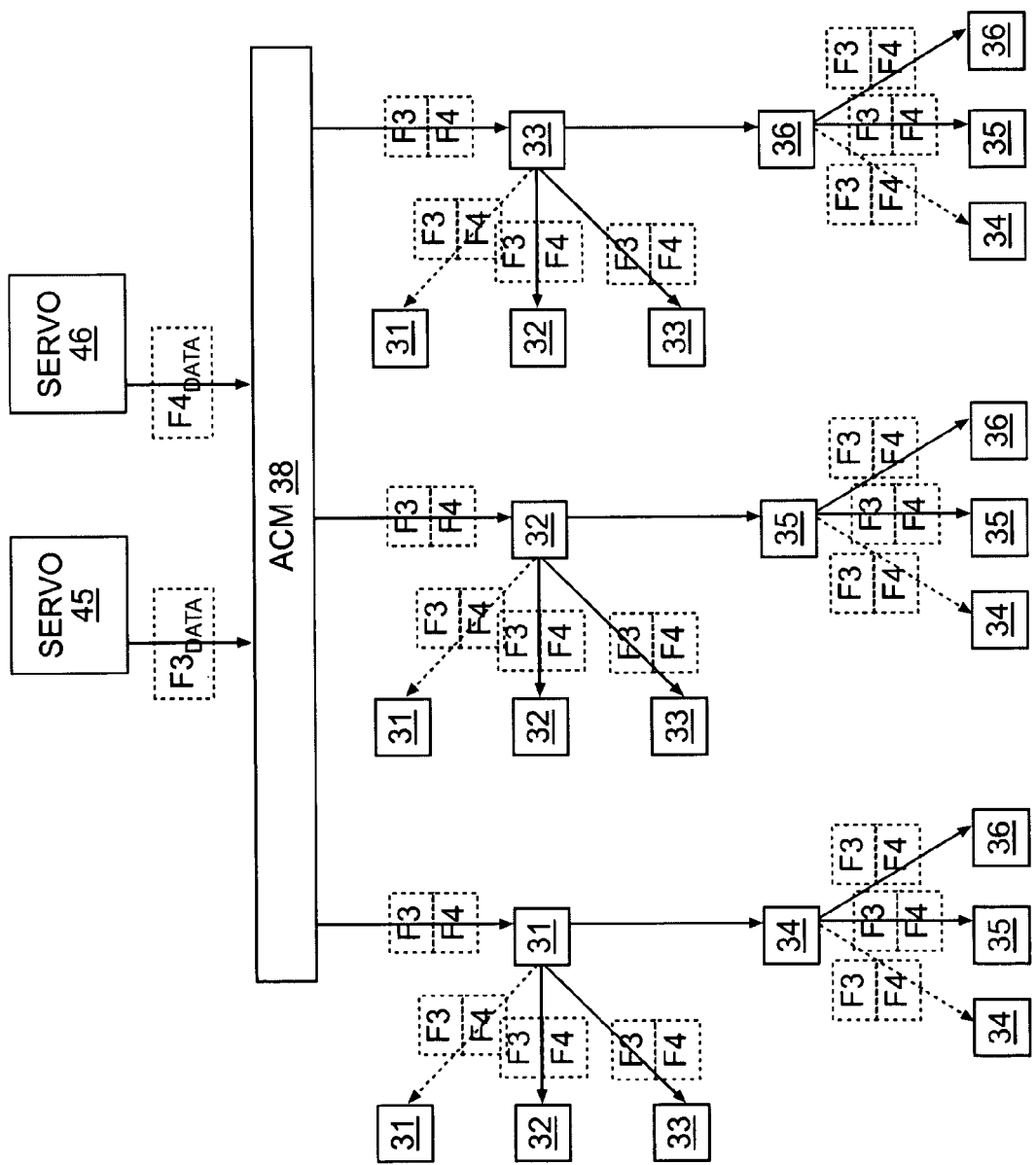
FIG. 10 discloses the data flow of actuator data in a control system according to an embodiment of the invention as described in FIG. 7.

In order to further clarify the data flow, FIG. 10 shows the data flow of actuator and ACM feedback data. ACM 38 collects data from actuator 45 and 46. This data together with internal data from the ACM itself relevant for actuator 45 and 46 are put into a data packet, F3 and F4. It should here be noted that the number of actuators that each ACM actuates may vary, for example from one, ten or the like. ACM 38 transfers the data packets F3 and F4 to different local DCMs 31, 32, 33. Each local DCM 31, 32, 33 receives the packet from the ACM 38. Each DCM then transfers the F34 to the internal process of itself, shown as a dotted line in FIG. 8. Furthermore, each DCM transfers the feedback data to the other local DCMs. For example, the second left DCM 32 receives the data from the ACM 38 and transfers the data to DCM 31 and DCM 33 as well as transfers the data to itself in order to use in its, for example, monitoring software program or the like. The DCM 32 also receives feedback data from the first left DCM 31 as well as from the third left DCM 33.

The local DCM, that is, the DCM in the left computer in the illustrated example, transfers the received data to a DCM of a second control computer, that is, the right FCC. It should here be noted that the local DCM may send voted data, that is, one value from each actuator based on a voting process performed in the local DCM, or may send the data as received, that is, three values for each actuator. The voting process will be described below. The DCM of the second computer receives the feedback data and transfers the data to its local DCMs. In the illustrated example, focusing on the second channel, the second right DCM 35 receives the data from the second left DCM 32 and transfers the data to the other DCMs 34 and 36. The DCM 35 further uses the received data for itself among the data received from the other DCMs 34 and 36 in, for example, performing a voting process in order to determine if the servomechanism is properly functioning.

The feedback data voting process performed in a DCM may be as follows. Initially, the program running in the DCM is trying to find one valid data packet from an ACM, starting by picking packets sent by the local channel, and use an order of priority to pick the next packet to select. The order to select which packet to select is defined in an embodiment as; a packet from the second left DCM has priority followed by a packet from the third left DCM and last a packet from the first left DCM 31.

The data in the valid data packets are used to vote a value. The following voting algorithm may be used based on number of data values found:

3 data values—MLV
2 data values—Average value
1 value—use value

It should be note that any voting algorithm, not only the one described above, may be used.

Figure 11:
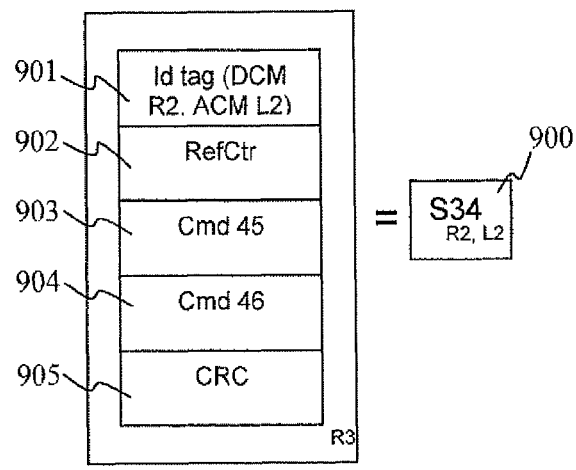
FIG. 11 shows schematically a structure of a packet transferred from a DCM in an embodiment of the present invention.

FIGS. 11 and 12 show a schematic overview of the packets that are sent between the different components of the system. FIG. 11 discloses a packet 900, S34, from the second right DCM 35 of the right FCC 30 that contains control commands for the actuator 45 and 46. The packet contains an "idtag" field 901, which identifies where the packet is coming from and to which ACM it is sent to. In the shown example the packet is identified as coming from the second right DCM 35 going to ACM 38. Furthermore, the packet contains a block 902 including a reference control update value RefCtr, used to validate that the packet is correctly updated. As shown, these blocks are followed by a block 903 containing the command intended for the actuator 45, cmd 45, and a block 904 containing the command of the actuator 46, cmd 46. Additionally, the packet 900 contains a CRC-field 905 containing a checksum value in order to validate the packet. A cyclic redundancy check (CRC) is a type of hash function used to produce a checksum—a small, fixed number of bits—against a block of data, such as a packet of network traffic or a block of a computer file. The checksum is used to detect errors after transmission or storage. A CRC is computed and appended before transmission or storage, and verified afterwards by the recipient to confirm that no changes occurred in transit.

In FIG. 12, a packet 1000, F34, containing feedback data from an ACM is disclosed. The feedback data relates to the actuator 45 and the actuator 46. The packet contains a first block 1001 including an "idtag"-value, identifying the origin of the packet. Furthermore, the packet contains a "RefCtr" block 1002, in order to validate the packet. The RefCtr-block is followed by a block 1003 containing data relating to the actuator 45 and a block 1004 containing data relating to the actuator 46. Additionally, the packet contains a CRC-block 1005 in accordance with what is stated above.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. An electrical system of an aircraft, comprising:
a first control computer configured to control at least one first actuator,
a second control computer configured to control at least one second actuator,
wherein the first control computer comprises at least one first digital control module and one second digital control module configured to calculate control command data for the at least one first actuator and at least one second actuator,
wherein the second control computer comprises at least one first digital control module and one second digital control module,
wherein each digital control module of each control computer is arranged to calculate a control command for the actuator unit of the first control computer,
wherein the calculated control command from each digital control module is arranged to be transferred internally of the first control computer and the second control computer to the other digital control modules residing in the first control computer and the second control computer,
wherein the first digital control module of the second control computer and the first digital control module of the first control computer form a communications pair, wherein the first digital control module of the second control computer is configured to communicate the calculated control command data for the at least one first actuator to the first digital control module of the first control computer,
wherein the first control computer comprises a first actuator control module connected with a physical connection to the first digital control module and configured to receive from the first digital control module the control command data for the at least one first actuator calculated by the first digital control module and the second digital control module of the first control computer and the control command data for the at least one first actuator calculated by the first digital control module and the second digital control module of the second control computer and to provide control signals to control the at least one first actuator to a desired position based on the control command data from the first digital control module and the second digital control module of the first control computer and the second control computer.

2. The system according to claim 1, wherein each digital control module is arranged to receive actuator data from an actuator control module from the first control computer and/or a second control computer.

3. The system of a vehicle according to claim 1, wherein the first digital control module of the first control computer is arranged to communicate the calculated control command data for the at least one second actuator to the first digital control module of the second control computer, wherein the second control computer comprises a second actuator control module arranged to receive from the first digital control module of the second control computer the control command data for the at least one second actuator calculated by the first digital control module and the second digital control module of the second control computer and the control command data for the at least one second actuator calculated by the first digital control module and the second digital control module of the first control computer and to provide control signals to control the second actuator to a desired position based on the control command data from the first digital control module and the second digital control module of the first control computer and the second control computer.

4. The system according to claim 3, further comprising:
a digital data carrier arranged to connect the first control computer and the second control computer, wherein the second computer comprises a third digital control module, a third actuator control module configured to control a third actuator, a fourth digital control module, and a fourth actuator control module configured to control a fourth actuator, wherein the third digital control module is configured to generate and transfer control command data for the at least one first actuator to the fourth digital control module and the fourth digital control module is configured to generate and transfer control command data for the at least one first actuator to the third digital control module, furthermore, is the third digital control module arranged to receive control command data relating to the at least one first actuator from the fourth digital control module, and the fourth digital control module is arranged to receive control command data relating to the at least one first actuator from the third digital control module, wherein the third digital control module and the fourth digital control module are arranged to transfer the control command data toward the first actuator control module via the first digital control module of the first control computer and the first digital control module of the second control computer.

5. The system according to claim 4, wherein the third digital control module is arranged to transmit the control command data over a point to point connection on the digital data carrier to one of the digital control modules of the first control computer and the fourth digital control module is arranged to transmit the control command data over a point to point connection on the digital data carrier to a different digital control modules of the first control computer.

6. The system according to claim 4, wherein the first digital control module is arranged to receive the control command data relating to the first actuator from the third digital control module, and the first digital control module of the second control computer is arranged to receive the control command data relating to the first actuator from the fourth digital control module, wherein the first digital control module of the first control computer and the first digital control module of the second control computer are arranged to transfer the control command data to the first actuator control module.

7. The system according to claim 1, wherein the first control computer comprises a first voting mechanism that allows any number of digital control modules residing in the first computer to produce an output to be used in voting process to determine the mode of the at least one first actuator connected to the first control computer, and wherein the second control computer is arranged to perform a second voting process, with inputs from any number of digital control modules residing in the second control computer, and wherein the result of this second voting is configured to be used as an input to the first voting mechanism in order to determine a mode of said actuator.

8. The system according to claim 2, wherein the actuator data is used in the calculation of the first control command data.

9. The system according to claim 2, wherein the actuator data is used in determining an output indicating a set condition of an actuator mode valve.

10. The system according to claim 1, wherein each digital control module is configured to check the validity of the calculated control command data.

* * * * *